US007809404B2

(12) United States Patent
Daniels et al.

(10) Patent No.: US 7,809,404 B2
(45) Date of Patent: Oct. 5, 2010

(54) MIMO PASSIVE CHANNEL EMULATOR

(75) Inventors: Melanie Daniels, Folsom, CA (US); Stanley K Ling, Rocklin, CA (US); Raymond Blackham, Penn Valley, CA (US)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 11/594,403

(22) Filed: Nov. 8, 2006

(65) Prior Publication Data

US 2008/0123756 A1    May 29, 2008

(51) Int. Cl.
*H04M 1/00*    (2006.01)

(52) U.S. Cl. .................. 455/562.1; 702/342; 702/343; 703/23; 703/24; 703/25; 455/67.14

(58) Field of Classification Search .............. 455/562.1, 455/226.1, 26.18
See application file for complete search history.

(56) References Cited

U.S. PATENT DOCUMENTS 6,308,078 B1 * 10/2001 Van De Water ............. 455/503

| | | | | |
|---|---|---|---|---|
| 6,600,382 B1 * | 7/2003 | Klymyshyn | ............... | 332/144 |
| 7,154,959 B2 * | 12/2006 | Erceg et al. | ............... | 375/267 |
| 7,359,449 B2 * | 4/2008 | Feher | ............... | 375/279 |
| 2005/0276339 A1 * | 12/2005 | Chow et al. | ............... | 375/260 |
| 2006/0088114 A1 * | 4/2006 | Chen et al. | ............... | 375/260 |

FOREIGN PATENT DOCUMENTS

KR    2002093299    * 12/2002

OTHER PUBLICATIONS

Elektrobit Group, "Propsim C8 -Multichannel Emulator", http://www.propsim.com/index.php?1982, (Sep. 15, 2005).

* cited by examiner

*Primary Examiner*—Charles N Appiah
*Assistant Examiner*—Xiang Zhang
(74) *Attorney, Agent, or Firm*—Lee & Hayes, PLLC

(57) ABSTRACT

Embodiments of methods and means for passively emulating channels in a multiple-input multiple output (MIMO) system are provided. Such embodiments include passively splitting a plurality of radio frequency signals into a greater plurality of such signals. Each of the greater plurality of radio frequency signals can then be selectively and passively attenuated, delayed and/or phase shifted. The resulting modified radio frequency signals are then recombined crossed over channels and coupled to a plurality of output nodes. Economical and versatile device and system testing is thus facilitated in a low-noise radio frequency environment without the need for complex up/down frequency or analog/digital conversions.

11 Claims, 5 Drawing Sheets

MIMO PASSIVE CHANNEL EMULATOR

BACKGROUND

Multiple-input multiple-output (MIMO) communication techniques exploit performance gains achieved by using multiple transmit and receive antennas within a system to provide un-correlated propagation channels between a transmitter and receiver. Typically, it is the correlation between different antenna elements (e.g., propagation paths) that enables multiple-input multiple-output techniques to realize advantageous performance in a realistic usage environment. Such performance advantages include increased throughput and operating range at the same bandwidth and same overall transmit power as other prior communications techniques.

During testing and development of multiple-input multiple-output communications equipment, channel emulators are sometimes employed to simulate usage conditions. It is desirable that a channel emulator be able to simulate realistic multiple-input multiple-output scenarios with accuracy, repeatability and performance that does not limit the performance (or apparent performance) of a device under test (DUT). At least one known multiple-input multiple-output channel emulator is based on: down-conversion of a signal from radio frequency to baseband; conversion of baseband signal from analog to digital; application of a predetermined baseband channel model (i.e., simulation scenario); conversion of the model signal from digital back to analog; and up-conversion of the analog signal from baseband back to radio frequency.

Under the known operational sequence outlined above, the channel model is applied digitally at a baseband sample rate, thus permitting such a channel emulator to apply virtually any sophisticated, dynamically varying channel model. However, this known approach also introduces noise and distortion at each step in the sequence described above, resulting in a noise floor on the signal that may limit the ultimate performance of the device under test and/or provide misleading indications as to one or more aspects the devices overall behavior. In some situations—including almost all high data rate scenarios—this noise floor problem is such that a device or system under scrutiny cannot be fully validated. These known channel emulators also tend to be relatively expensive, with some units exceeding $500,000 in cost, while being limited to a four-transmit/four-receive channel operation.

DETAILED DESCRIPTION

Introduction

Figure 1:
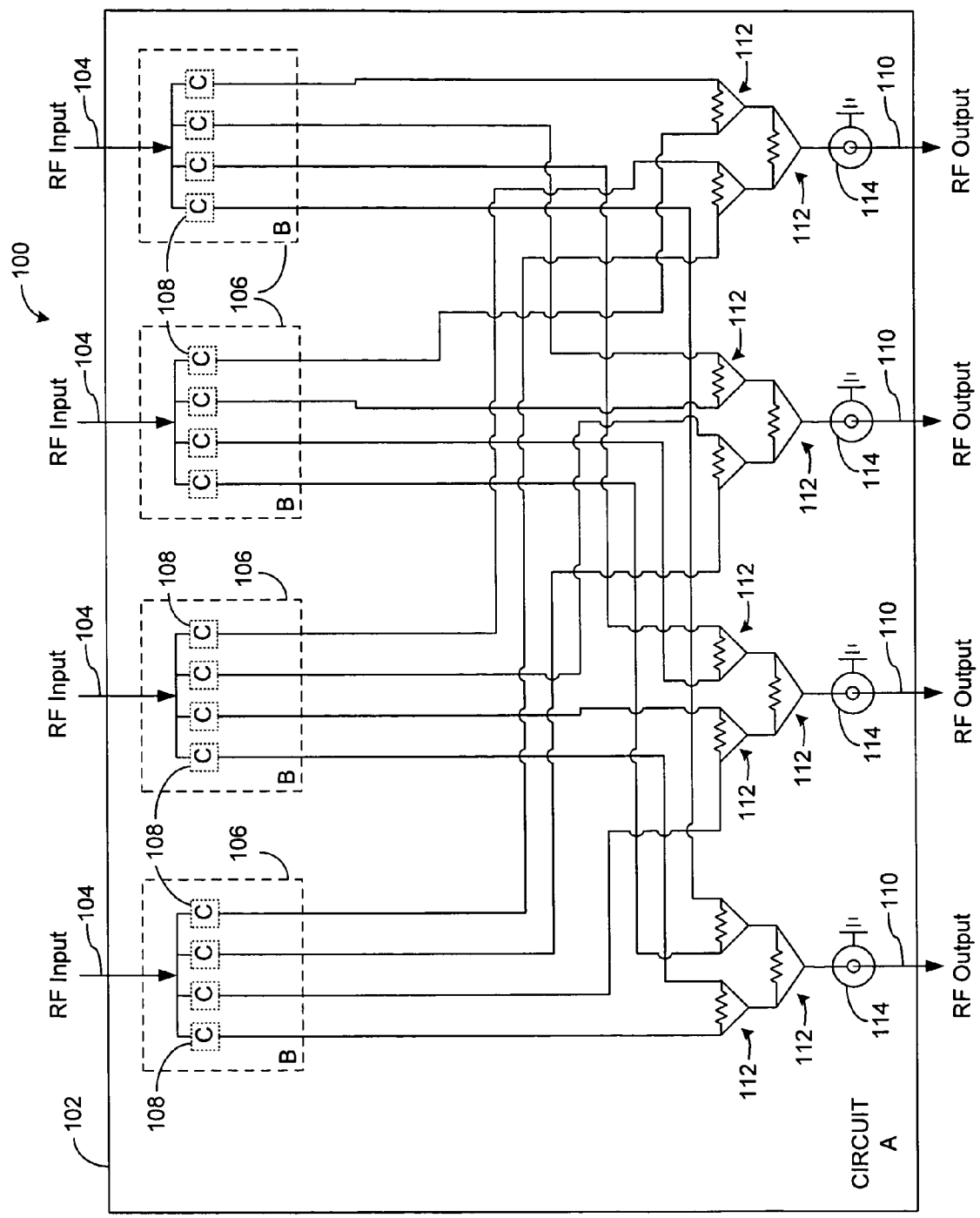
FIG. 1 illustrates a device topology in accordance with one embodiment.

Embodiments contemplated herein provide multiple-input multiple-output passive channel emulators that can repeatably emulate user-defined or measured static channel models. Such passive channel emulators are test tools that can be utilized to evaluate the effects of channel attenuation, frequency selectivity, and channel correlation. These embodiments utilize integrated design aspects including passive signal splitting and re-combining, and provide a stable test bench for the emulation of multi-channel environments. Embodiments of apparatus and techniques herein can be used for the development of multiple-input multiple-output algorithms, as well as for the integration and verification or comparison of multiple-input multiple-output-capable wireless products and systems. In accordance with these embodiments, dynamic path delay models are constant, and losses (i.e., signal attenuations) are selectively variable. The corresponding attenuation, delay and/or phase shifting parameters can be respectively set manually (requiring no software interface), or with a simple graphical user interface, depending on the particular embodiment under consideration.

Also, the embodiments presented herein are relatively economical to provide and use, and utilize an overall architecture (topology) that achieves increased noise floor performance and does not limit the performance of the device under test. Unlike known emulators, the passive channel emulator embodiments herein emulate a radio frequency channel, input to output, exclusively at radio frequency and without the need for analog-to-digital or digital-to-analog conversion, or down-conversion or up-conversion to/from baseband. Because the foregoing complexities are eliminated, the embodiments herein do not require relatively expensive components such as, for example, radio frequency and/or digital field programmable gate arrays.

Embodiments of passive channel emulators provide static channel emulation that is sufficient for most development and testing. Also, these embodiments allow efficient testing, making emulation possible for a high signal-to-noise ratio wireless fading channel, while further permitting more effective scheduling of more costly channel emulator resources.

As used herein, the terms "802.11", "802.16", "WiMAX" and "WiFi" refer to respective signaling standards defined by the Institute of Electrical and Electronics Engineers, Inc. (IEEE), Piscataway, N.J., USA. In particular, "WiMAX" refers to standards 802.16e-2005, 802.16e-2004/Cor 1-2005, and 802.16-2004, respectively, as defined by the IEEE. In regard to "WiFi", that term refers to standards 802.11g-2003, 802.11a-1999, 802.11b-1999, and 802.11-1997, respectively, as defined by the IEEE. As also used herein, "3GPP" refers to standards defined by the $3^{rd}$ Generation Partnership Project, a collaborative agreement established December, 1998 via international cooperation between ETSI (Europe), ARIB/TTC (Japan), CCSA (China), ATIS (North America) and TTA (South Korea).

Exemplary Embodiments

Attention is now turned to FIG. 1, which depicts a device 100 topology in accordance with one embodiment. The device 100 illustrates a four input/four output (i.e., 4×4) passive channel emulator. It is to be understood that the device 100 is exemplary of general topological aspects that can be readily employed in other N×M (e.g., 4×3, 2×2, etc.) passive channel emulator embodiments consistent with the subject matter herein. Therefore, the device 100 of FIG. 1 is exemplary and non-limiting in its overall teachings.

The device 100 includes a circuit 102. The circuit 102 is also designated as "CIRCUIT A" in FIG. 1. Circuit 102 includes four inputs 104 respectively configured to receive a corresponding radio frequency signal. The four inputs 104 are electrically coupled to four respective circuits (blocks, or sub-circuits) 106. Each circuit 106 is also designated as "B"

in FIG. 1. In turn, each circuit 106 includes four circuits (blocks, or sub-circuits) 108. Each circuit 108 is also designated as "C" as illustrated by FIG. 1. Thus, circuit 102 reflects a hierarchical, building-block type structure. In any case, it is to be understood that the circuit 102 of FIG. 1 is inclusive of four circuits 106 and sixteen circuits 108.

The circuit 102 (i.e., CIRCUIT A) also includes four outputs 110. Each output 110 is configured to provide, or facilitate electrical coupling to, a radio frequency signal that has been derived (processed) by the overall constituency of circuit 102. Each of the inputs 104 and outputs 110 is also referred to as a node for purposes herein. The circuit 102 also include a plurality of signal splitters (hereinafter, splitters) 112. Radio frequency signals are coupled from each of the circuits 108, via the corresponding circuits 106, to one or more of the outputs 110 by way of the splitters 112. As depicted in FIG. 1, each splitter 112 is configured to passively re-combine a pair of radio frequency signals. Thus, the splitters 112 depicted in FIG. 1 function essentially as signal "re-combiners".

The circuit 102 of FIG. 1 also includes a plurality of connectors 114. Each connector 114 can be defined by any suitable known means for coupling wiring or cabling to the outputs (i.e., nodes) 110. In one or more embodiments, the connectors 114 are respectively defined by circuit board-mounted coaxial cable connectors. Other suitable connectors 114 can also be used. In this way, the outputs 110 of circuit 102 can be conveniently coupled to other electronic entities generally external to the circuit 102. Non-limiting examples of such generally external entities include radio frequency transceivers, oscilloscopes, frequency counters, signal analyzers, signal acquisition and detection devices, etc.

The circuit 102 of FIG. 1 is inclusive of overall circuitry such that four discrete radio frequency signals can be received, and then the four signals passively split into sixteen distinct radio frequency signals (e.g., by way of circuits 106), and then these sixteen radio frequency signals passively split into a total of sixty-four distinct radio frequency signals (e.g., by way of circuits 108). Each of the sixty-four, passively derived radio frequency signals can also be considered a portion of one of the original four received radio frequency signals. The particular means for this passive splitting operation shall be discussed in greater detail below. Greater detail of each of circuits 106 and 108 (B and C, respectively) of the overall circuit 102 is provided below.

The circuit 102 of FIG. 1 is intended to represent an overall passive channel emulator as a unitary whole in accordance with the present subject matter. The circuit 102 can be used as a module in an overall testing system. In one system-level embodiment, two like circuits 102 are coupled to a corresponding number of transceivers, signal circulators, and/or other devices as a part of a development and testing strategy. Other usage configurations incorporating the circuit 102, or other embodiments consistent with this subject matter, can also be defined and used.

Figure 2:
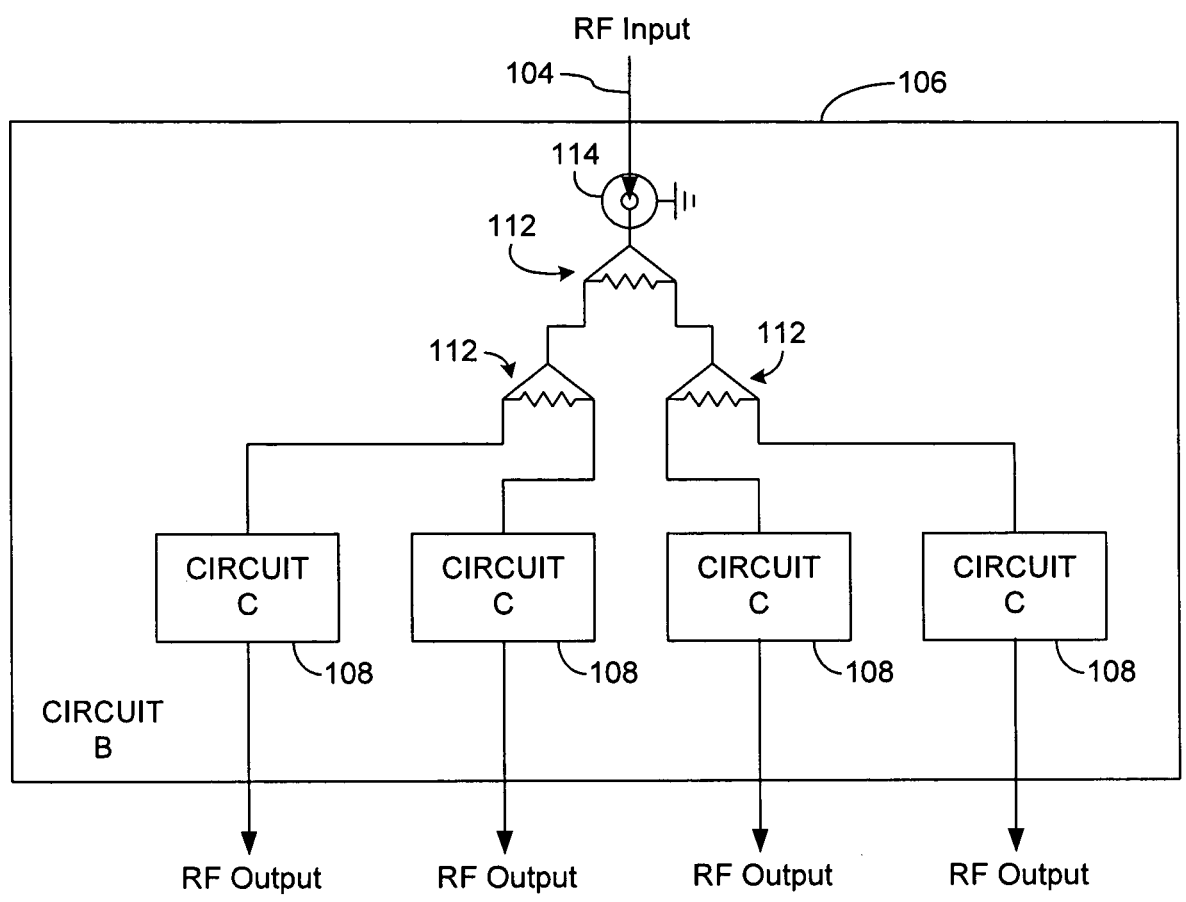
FIG. 2 illustrates a circuit topology corresponding to FIG. 1 in accordance with one embodiment.

FIG. 2 is now considered, which illustrates a circuit (or sub-circuit) 106 as introduced above in greater detail. The circuit 106 (i.e., CIRCUIT B) includes a plurality of passive signal splitters 112. Each of the splitters 112 of FIG. 2 is configured to passively derive a pair of radio frequency signals or signal portions. As illustrated, the splitters 112 of FIG. 2 are configured to derive a total of four radio frequency signals (or portions). The circuit 106 further includes a connector 114 configured to facilitate coupling the circuit 106 to a radio frequency input signal. The connector 114 of FIG. 2 corresponds to an input (node) 104 of circuit 102 of FIG. 1. The connector 114 can be defined by any suitable connector as discussed above in regard to FIG. 1. The circuit 106 also includes four circuits 108 as introduced above.

Figure 3:
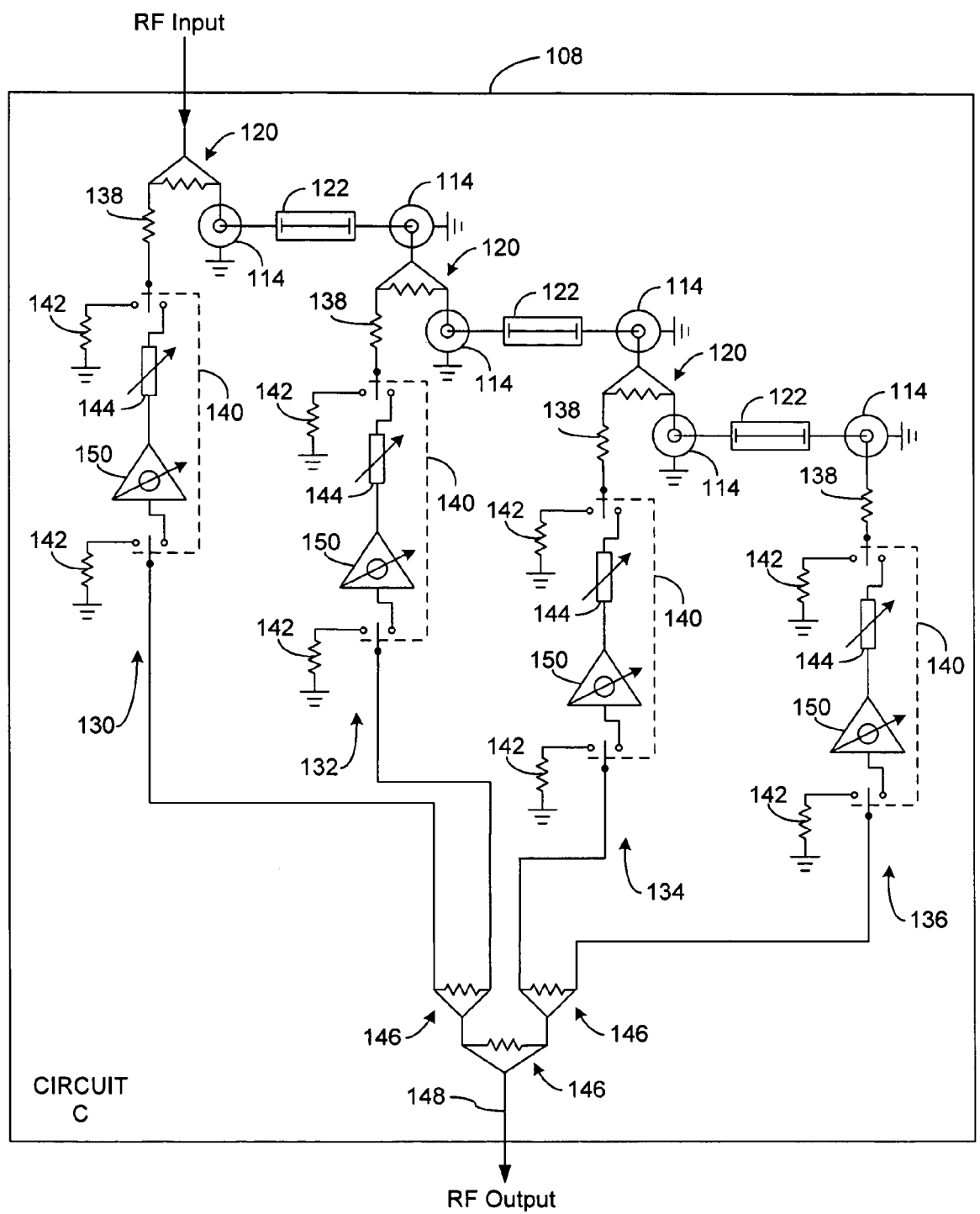
FIG. 3 illustrates another circuit topology corresponding to FIG. 1 in accordance with one embodiment.

In turn, FIG. 3 illustrates a circuit (or sub-circuit) 108 in greater detail. The circuit 108 (i.e., CIRCUIT C) includes a plurality of passive splitters 120. Each of the splitters 120 is configured to derive a respective pair of radio frequency signals (or portions) from an input radio frequency signal. In one embodiment, the splitters 120 of FIG. 3 are essentially equivalent to the splitters 112 of FIG. 2.

The circuit 108 of FIG. 3 further includes a plurality of connectors 114. Each connector 114 can be suitably defined by any means such as, for example, a coaxial cable connector, etc. Other connectors 114 can also be used. In any case, each connector 114 is configured to facilitate radio frequency signal inter-connections within the circuit 108 by way of corresponding cables 122.

Each cable 122 is of a length corresponding to a predetermined radio frequency path delay. Thus, each cable 122 can be individually selected with respect to length (and/or other salient parameters) so as to establish respective signal delays within the circuit 108. In one embodiment, each cable 122 is selected so as to establish a twenty nanosecond delay. Other delays can also be used. In this way, discrete radio frequency signals (or portions thereof) can be selectively and passively delayed so as to establish an overall static path delay model for use in device and/or system testing and validation. In another embodiment (not shown), each cable 122 is represented by a plurality of cables of differing respective lengths and suitable switching means are employed such that varying delay characteristics can be selected during use of the circuit 108, without the need to shut down and/or manually swap out different cables 122.

As depicted in FIG. 3, four discrete radio frequency signal pathways, respectively designated as 130, 132, 134 and 136, are ultimately defined by way of cooperation of the signal splitters 120, connectors 114 and/or cables 122. In this way, radio frequency signal pathways 132, 134 and 136 can include user-selected static delays. Each signal pathway 130-136 of FIG. 3 includes a fixed attenuation element 138 coupled to a corresponding one of the splitters 120. In one embodiment, the respective attenuation elements 138 are defined by fixed resistors of predetermined value (i.e., Ohms). Other attenuation elements 138 can also be used. Each signal pathway 130-136 also includes a pair of interlocked switches 140, a pair of predetermined resistive loads 142, a variable radio frequency attenuator (also herein, variable attenuator) 144, and a variable phase shifter 150. In another embodiment, the variable phase shifter 150 is omitted from one or more of the signal pathways 130-136.

A first position of each pair of the interlocked switches 140 electrically couples the resistive loads 142 (e.g., fifty Ohms each, etc.) into the corresponding pathway (130-136), while isolating the corresponding variable attenuator 144 and variable phase shifter 150. Such a first position can be used, for example, during calibration of the circuit 108, the circuit 102 of FIG. 1 that is host thereto, and/or some other aspect of a system-level testing arrangement. A second position of each pair of the interlock switches 140 electrically couples the variable attenuator 144 and variable phase shifter 150 into the corresponding pathway (130-136), while isolating the corresponding resistive loads 142. Such a second position is typically used during actual radio frequency device testing at a system level.

Each variable attenuator 144 of FIG. 3 can be defined numerous ways as contemplated herein. In one embodiment, each variable attenuator 144 is defined by a dual in-line package (DIP) switch (not specifically shown) coupled to a respective plurality of fixed resistors (not specifically shown). Manual actuation of the individual switches (i.e., bits) permits discrete attenuation values to be selected, either alone or in selective combination with one another. In one such embodiment, a five-bit, dual in-line package switch and corresponding resistors are selected so as to permit attenuation values to be selected in accordance with Table 1 below:

TABLE 1

| Bit 16 | Bit 8 | Bit 4 | Bit 2 | Bit 1 | Total Attenuation |
|---|---|---|---|---|---|
| 0 | 0 | 0 | 0 | 0 | Loss, Reference |
| 0 | 0 | 0 | 0 | 1 | 1 dB |
| 0 | 0 | 0 | 1 | 0 | 2 dB |
| 0 | 0 | 1 | 0 | 0 | 4 dB |
| 0 | 1 | 0 | 0 | 0 | 8 dB |
| 1 | 0 | 0 | 0 | 0 | 16 dB |
| 1 | 1 | 1 | 1 | 1 | 31 dB |

Where:
0 = Bit Switch Open;
1 = Bit Switch Closed

In another embodiment, the variable attenuator 144 is defined by a digital attenuator with attenuation values to be selected in accordance with Table 1 above and is used in conjunction with an input/output (I/O) port expander or CPLD (not shown) so that discrete attenuation levels may be provided under remote computer control (e.g., using an SPI or I2C interface, etc.). One such digital attenuator 144 is defined by a model AT90-0001 Digital Attenuator available from M/A-COM, Lowell, Mass., USA.

Each variable phase shifter 150 of FIG. 3 can be defined by any suitable such device for use in the radio frequency range of interest. In one embodiment, each variable phase shifter 150 is defined by a voltage-variable phase shifter configured to operate in the range of about 3.5 GHz to about 6.0 GHz. One such phase shifter 150 is defined by a model MAPCGM0002 6-bit Phase Shifter available from M/A-COM, Lowell, Mass., USA. In one embodiment, such a variable phase shifter 150 is configured and operable via the same interface used for the digital attenuator 144 in accordance with Table 2 below:

TABLE 2

| Pin | Desig. | Description | Level | State |
|---|---|---|---|---|
| 22 | A6 | 180° Phase Bit: MSB | High | ≈ −180° |
| 23 | A5 | 90° Phase Bit | High | ≈ −90° |
| 24 | A4 | 45° Phase Bit | High | ≈ −45° |
| 25 | $V_{EE}$ | DC Supply Voltage | −5 V | ON |
| 26 | A3 | 22.5° Phase Bit | High | ≈ −22.5° |
| 27 | A2 | 11.2° Phase Bit | High | ≈ −11.2° |
| 28 | A1 | 5.6° Phase Bit | High | ≈ −5.6° |

In such a computer controlled embodiment, corresponding software enables various automated test sequences to be defined and used, and eliminates the tedium (and potential for manual setting error) that can occur under the manual bit-setting procedures discussed immediately above. Furthermore, such a computer controlled value-setting embodiment can facilitate automated emulation of specific IEEE I-METRA channel model propagation scenarios. Additional information regarding I-METRA testing protocols is provided in Jean Phillipe Kermoal et al, *A Stochastic MIMO Radio Channel Model With Experimental Validation*, IEEE Journal On Selected Areas in Communications, Vol. 20, No. 6, pp. 1211-1226, August, 2002. Other means for providing variable radio frequency signal attenuation by way of corresponding elements 144 can also be used.

Other suitable variable phase shifters 150 can also be used, such as are available from Agile Materials & Technologies, Inc., Goleta, Calif., USA. In any event, each phase shifter 150 is configured to permit independent, selective phase shifting of the radio frequency signal (or portion) corresponding to each signal pathway 130-136.

The circuit 108 also includes a plurality of passive splitters 146. Each splitter 146 is configured to re-combine a pair of radio frequency signals into a single radio frequency signal output. Thus, each of the splitters 146 is essentially being operated in "reverse", so as to unite a pair of radio frequency signals (or portions) at a single node. In one embodiment, the splitters 146 of FIG. 3 are essentially equivalent to the splitters 112 of FIG. 1. As also illustrated in FIG. 3, the splitters 146 combine pairs of radio frequency signals in a cascading fashion such that four radio frequency signals—as respectively attenuated, delayed and/or phase shifted (i.e., modified) within the signal pathways 130-136—are recombined and provided at a single output 148 of the circuit 108.

Exemplary Methods

Figure 4:
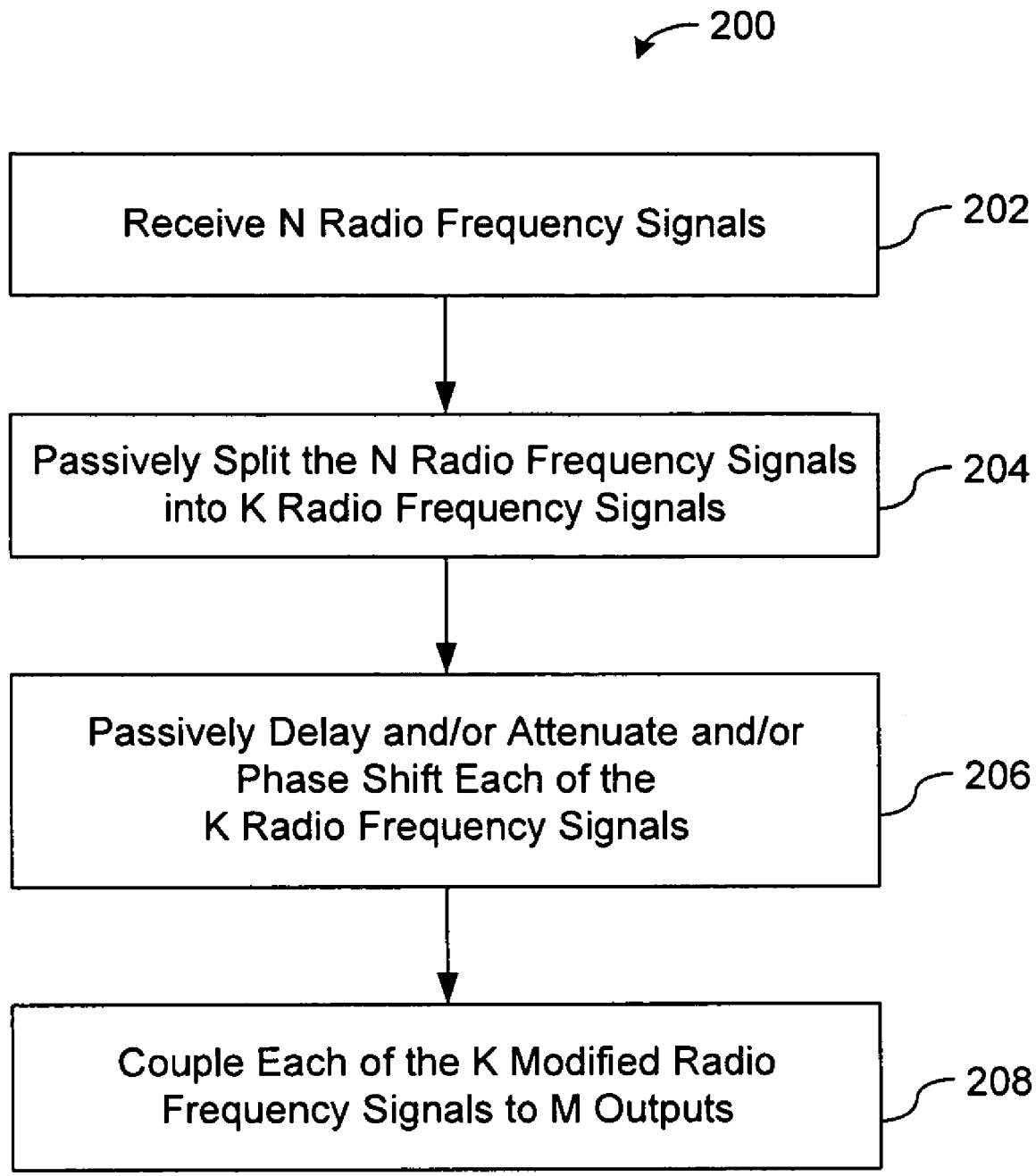
FIG. 4 illustrates a process flow diagram in accordance with one embodiment.

FIG. 4 is a flowchart 200 that describes a method in accordance with one embodiment. While the flowchart 200 describes particular methodical acts and order of execution, it is to be understood that the method of flowchart 200 is contemplated to be suitably varied, broadly applicable, and is not limited as specifically presented. Thus, other embodiments contemplated herein can be configured and/or performed wherein selected acts represented by the flowchart 200 are modified and/or omitted, and/or other acts not specifically depicted therein are executed.

At 202 of FIG. 4, a plurality of radio frequency signals is received. Such reception is understood to take place using a multiple-input multiple-output passive channel emulator in accordance with the present subject matter. For purposes of example, it is assumed that four discrete radio frequency signals are received by an emulator consistent with circuit 102 of FIG. 1 (i.e., N=4). The received radio frequency signals can correspond, for example, to wireless local area network signals, WiMAX signals, IEEE 802.11 signals, WiFi signals, etc. Other suitable radio frequency signal formats can also be used and received.

At 204 of FIG. 4, the plurality of received radio frequency signals is passively split into a greater plurality of radio frequency signals. For purposes of ongoing example, it is assumed that corresponding elements of circuits 106 and 108 of the exemplary circuit 102 (see FIGS. 1-3) function to passively split the four received radio frequency signals into sixty-four discrete radio frequency signals or portions of the original radio frequency signals (i.e., K=64). It is further understood that each of these sixty-four radio frequency signals corresponds to a respective signal pathway (e.g., 130-136, etc.) of a corresponding one of the circuits (i.e., blocks, or sub-circuits) 108 of the overall circuit 102.

At 206 of FIG. 4, each of the greater plurality of radio frequency signals is selectively delayed, attenuated and/or phase shifted so as to derive a like plurality of individually modified radio frequency signals. In some embodiments, phase shifting is not performed. In the ongoing example, it is assumed that sixteen signals are attenuated (only), forty signals are attenuated and delayed and phase shifted, and the remaining eight signals are delayed and phase shifted, such that sixty-four modified radio frequency signals are derived. This is but one of numerous operational scenarios in accordance with the present subject matter. Thus, each of the sixty-four exemplary radio frequency signals is individually and selectively modified by way of corresponding elements of the circuits 108 of the circuit 102 (FIGS. 1-3).

At 208 of FIG. 4, each of the greater plurality of modified radio frequency signals is coupled to at least one of a plurality of outputs. In the example, each of the sixty-four modified radio frequency signals is coupled to at least one of four outputs 110 (nodes) of the circuit 102 of FIG. 1 (i.e., M=4). This exemplary coupling or routing is also referred to as cross-over channel routing as the radio frequency signals are delivered to the output nodes 110.

Exemplary System

Figure 5:
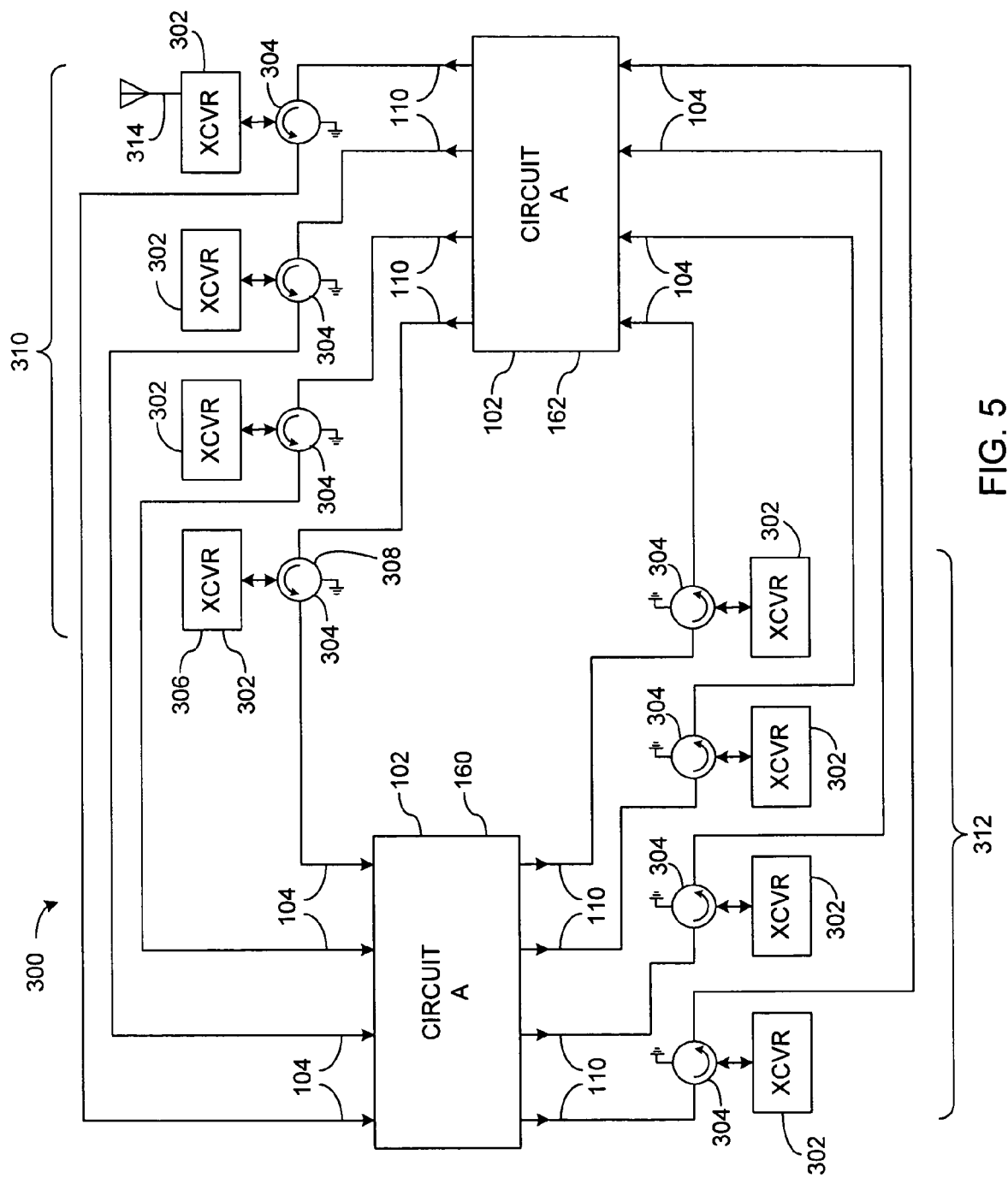
FIG. 5 illustrates a system in accordance with one embodiment.

FIG. 5 depicts an exemplary system 300 according to another embodiment. System 300 is intended to exemplify but one of any number of possible systems inclusive of means and/or methods provided herein. An M×N emulator can be configured as an Q×R emulator with Q<=M and R<=N by appropriately terminating inputs/outputs—thus, a single M×N emulator can cover a wide range of multiple-input multiple-output channel topologies. Thus, the exemplary system 300 is understood to be illustrative and non-limiting in its overall teachings.

The system 300 includes a pair of circuits 102 as defined and described above in regard to FIGS. 1-3. Thus, each of the circuits 102 is further defined to be a four-input, four-output (i.e., multiple-input multiple-output) passive channel emulator in accordance with the present subject matter. As depicted in FIG. 5, each of the circuits 102 is configured to receive four radio frequency signals by way of corresponding inputs (i.e., nodes) 104, and to provide four modified radio frequency signals by way of corresponding outputs 110.

The system 300 also includes a total of eight radio frequency transceivers (transceivers) 302 (four transceivers for two multiple-input multiple-output systems). Each of the transceivers 302 can be respectively defined by a standard such device of known calibration and performance, or by a transceiver device under test, in any suitable combination. In any case, each transceiver is configured to transmit and receive radio frequency signals of a corresponding format (WiFi, WiMAX, etc.). As depicted in FIG. 5, one (or more) of the transceivers 302 may be coupled to an antenna 314.

The system 300 also includes a total of eight signal circulators 304. Each signal circulator is configured to couple one of the transceivers 302 in radio frequency signal communication with an input 104 of a particular circuit 102, and with an output 110 of the other circuit 102. As depicted in FIG. 5, for example, the transceiver designated 306 transmits radio frequency signals to the circuit designated 160, and receives radio frequency signals from the circuit designated 162, by way of action of the circulator designated 308.

In one non-limiting operational example, the four transceivers 302 within grouping 310 are assumed to be standard devices of known calibration and performance criteria. These four transceivers are coupled so as to transmit radio frequency signals of predetermined characteristics to the passive channel emulator represented by circuit 160.

The circuit 160 then passively modifies the four radio frequency signals received from the transceiver group 310 in accordance with desired delay, attenuation and/or phase shifting criteria. In one scenario, such criteria are defined by a selected IEEE I-METRA protocol. In any case four modified, cross-over channel radio frequency signals are provided at the outputs 110 of the circuit 160.

The transceivers 302 within the grouping 312 are presumed to be respective transceiver devices under development or other testing. The transceivers 302 of group 312 receive the modified radio frequency signals from the circuit 160 in accordance with the assumed exemplary test scenario and perform respectively in accordance therewith.

Each transceiver 302 in the test grouping 312 then transmits a respective radio frequency signal that is coupled to the inputs 104 of passive channel emulator represented by circuit 162. Therein, the received radio frequency signals are modified in accordance with a selected protocol, and coupled to the transceivers 302 of the standard grouping 310. In this way, two similar or different testing protocols can be used simultaneously to evaluate the four transceivers 302 of the test group 312. In accordance with the description above, this testing procedure can be manually controlled, automated, or performed under some select combination of manual and automatic means.

CONCLUSION

Embodiments and methods presented herein can provide versatile and economical multiple-input multiple-output passive channel emulators for testing and evaluating radio frequency equipment and system under WiFi, WiMAX 802.16, 802.11, 3GPP and/or other wireless protocols. These embodiments facilitate selective radio frequency signal attenuation, delaying and/or phase shifting such that numerous known as well as novel testing protocols can be performed.

Furthermore, the present subject matter performs without the need for frequency up-conversion or down-conversion, nor the need for conversion between analog and digital domains. The simplistic elegance of the present subject matter makes possible a low noise floor, exclusively radio frequency testing environment that is readily scalable to N×M (input×output) system configurations.

Although the embodiments have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

What is claimed is:

1. an apparatus, comprising:
    circuitry configured to:
    receive a plurality of radio frequency signals by way of an equal plurality of inputs of the circuitry;
    passively split the plurality of radio frequency signals into a greater plurality of radio frequency signals;
    passively attenuate a first radio frequency signal of the greater plurality of radio frequency signals;
    passively delay the first radio frequency signal of the greater plurality of radio frequency signals by a predetermined delay, wherein passively delaying the first radio frequency signal comprises utilizing a cable selected from a plurality of cables, wherein each cable of the plurality of cables is associated with a fixed delay, wherein the fixed delay is determined by the length of the cable;
    passively phase shift the first radio frequency signal of the greater plurality of radio frequency signals; and
    couple the first radio frequency signal of the greater plurality of radio frequency signals to one or more outputs of the circuitry, wherein the plurality of radio frequency signals are emulated, input to output, exclusively at the respective radio frequency without:
        analog-to-digital conversion;
        digital-to-analog conversion;

down-conversion to baseband; and
up-conversion from baseband.

2. The apparatus of claim 1, wherein the circuitry is further configured to:
passively attenuate a second radio frequency signal of the greater plurality of radio frequency signals and
couple the first and second radio frequency signal of the greater plurality of radio frequency signals to one or more of the outputs of the circuitry.

3. The apparatus of claim 1, wherein:
the plurality of radio frequency signals is equal to four;
the one or more outputs of the circuitry is equal to four; and
the greater plurality of radio frequency signals is equal to sixty-four.

4. The apparatus of claim 1, wherein the circuitry comprises at least one variable radio frequency attenuator configured to be selectively adjustable in response to an input.

5. The apparatus of claim 4, wherein the circuitry comprises at least one variable phase shifter configured to be selectively adjustable in response to an input.

6. A system, comprising:
an antenna;
a plurality of radio frequency transceivers, wherein at least one of the radio frequency transceivers is coupled to the antenna; and
a radio frequency circuit coupled to the plurality of radio frequency transceivers, wherein the radio frequency circuit is configured to:
receive an equal plurality of radio frequency signals from the plurality of radio frequency transceivers;
passively attenuate a portion of a first radio frequency signal of the plurality of radio frequency signals;
passively delay the first radio frequency signal of the plurality of radio frequency signals;
passively phase shift the first radio frequency signal of the plurality of radio frequency signals; and
couple the first radio frequency signal of the plurality of radio frequency signals to one or more outputs of the radio frequency circuit, wherein the first radio frequency signal is emulated, input to output, exclusively at the respective radio frequency without:
analog-to-digital conversion;
digital-to-analog conversion;
down-conversion to baseband; and
up-conversion from baseband; and
wherein the radio frequency circuit comprises a plurality of cables, each cable of respective a length corresponding to a predetermined radio frequency signal delay and a switching means that enables selection of a respective cable without the need to shut down the system or manually swap out cables.

7. The system of claim 6, wherein the radio frequency circuit is defined as a first radio frequency circuit and the plurality of radio frequency transceivers is defined as a first plurality of radio frequency transceivers, the system further comprising a second radio frequency circuit and a second plurality of radio frequency transceivers, wherein:
the first plurality of radio frequency transceivers are respectively coupled to an equal first plurality of inputs of the first radio frequency circuit; and
the second plurality of radio frequency transceivers are respectively coupled to an equal second plurality of inputs of the second radio frequency circuit.

8. The system of claim 7, wherein:
the first plurality of inputs of the first radio frequency circuit are respectively coupled to an equal first plurality of outputs of the second radio frequency circuit; and
the second plurality of inputs of the second radio frequency circuit are respectively coupled to an equal second plurality of outputs of the first radio frequency circuit.

9. The system of claim 8, further comprising a third plurality of signal circulators, wherein the first and second radio frequency circuits and first and second pluralities of radio frequency transceivers are respectively coupled by way of the third plurality of signal circulators.

10. The apparatus of claim 1, wherein the circuitry is further configured to:
passively delay a second radio frequency signal of the greater plurality of radio frequency signals; and
couple the first and second radio frequency signal of the greater plurality of radio frequency signals to one or more of the outputs of the circuitry.

11. The apparatus of claim 1, wherein the circuitry is further configured to:
passively phase shift a second radio frequency signal of the greater plurality of radio frequency signals and
couple the first and second radio frequency signal of the greater plurality of radio frequency signals to one or more of the outputs of the circuitry.

* * * * *